United States Patent
Hayashi

(10) Patent No.: US 10,545,768 B2
(45) Date of Patent: Jan. 28, 2020

(54) INFORMATION PROCESSING APPARATUS, INFORMATION PROCESSING METHOD, AND RECORDING MEDIUM

(71) Applicant: Yusuke Hayashi, Kanagawa (JP)

(72) Inventor: Yusuke Hayashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 275 days.

(21) Appl. No.: 15/788,386

(22) Filed: Oct. 19, 2017

(65) Prior Publication Data

US 2018/0121207 A1 May 3, 2018

(30) Foreign Application Priority Data

Oct. 27, 2016 (JP) .................................. 2016-211034
Sep. 7, 2017 (JP) .................................. 2017-172489

(51) Int. Cl.
G06F 9/44 (2018.01)
G06F 9/4401 (2018.01)

(52) U.S. Cl.
CPC .................................. G06F 9/4403 (2013.01)

(58) Field of Classification Search
CPC ..... G06F 1/32; G06F 1/26; G06F 1/28; G06F 9/44
See application file for complete search history.

(56) References Cited

U.S. PATENT DOCUMENTS

| 10,409,985 B2* | 9/2019 | Potlapally | G06F 21/55 |
| 2006/0092323 A1* | 5/2006 | Feeler | H04N 21/418 |
| | | | 348/553 |
| 2012/0072897 A1* | 3/2012 | Selvam | G06F 8/66 |
| | | | 717/171 |
| 2013/0036300 A1* | 2/2013 | Baik | G06F 9/4401 |
| | | | 713/2 |
| 2014/0281466 A1* | 9/2014 | Samuel | G06F 9/4408 |
| | | | 713/2 |
| 2017/0185429 A1* | 6/2017 | Jeansonne | G06F 21/572 |
| 2017/0308706 A1* | 10/2017 | Ray | G06F 9/4401 |

FOREIGN PATENT DOCUMENTS

| JP | 2006-285756 | 10/2006 |
| JP | 2011-173382 | 9/2011 |

* cited by examiner

*Primary Examiner* — Mohammed H Rehman
*Assistant Examiner* — Keshab R Pandey
(74) *Attorney, Agent, or Firm* — Harness, Dickey & Pierce, P.L.C.

(57) ABSTRACT

An information processing apparatus includes a first device and a second device that operate independently. The first device includes a first memory that stores a first model type value identifying an initialization process to be performed on the information processing apparatus in accordance with a specification of the first device and first circuitry that reports a notification including the first model type value read from the first memory to the second device. The second device includes a second memory that stores a second model type value and second circuitry that, in response to receiving a notification from the first device, reads the second model type value from the second memory, determines whether or not to perform the initialization process based on the second model type value and the first model type value included in the notification, and performs the initialization process based on a result of the determination.

8 Claims, 9 Drawing Sheets

INFORMATION PROCESSING APPARATUS, INFORMATION PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Applications No. 2016-211034, filed on Oct. 27, 2016 and No. 2017-172489, filed on Sep. 7, 2017 in the Japan Patent Office, the entire disclosure of which is hereby incorporated by reference herein.

BACKGROUND

Technical Field

The present invention relates to an information processing apparatus, an information processing method, and a non-transitory recording medium storing an information processing program.

Background Art

Image forming apparatuses, an example of information processing apparatuses, include a main unit and an operating unit (a control panel) that are independent of each other. The main unit performs various functions such as an image forming function and an image scanning function etc., and the operating unit accepts various inputs commanding the main unit to perform the functions. In the image forming apparatuses, the main unit has a hardware configuration specific to on types and specifications of available functions, such that the specifications of the main unit vary. In contrast, the operating unit has a common hardware configuration. As a result, in manufacturing the image forming apparatuses, it is required to initialize the operating unit to be compliant with the specification of the main unit.

For example, in initializing the operating unit, unnecessary application software is deleted among application software preinstalled in the operating unit, and application software is configured appropriately. The operating unit is initialized based on the specification of the main unit. Therefore, if it is required to replace the operating unit due to malfunction etc., it is required to initialize a new operating unit in a similar way.

In view of the above, in replacing the old operating unit that has been attached to the main unit with the new operating unit, information that the main unit is stored can be migrated to the operating unit.

SUMMARY

Example embodiments of the present invention provide a novel information processing apparatus that includes a first device and a second device that operate independent of each other. The first device includes a first memory that stores a first model type value identifying an initialization process to be performed on the information processing apparatus in accordance with a specification of the first device and first circuitry that reports a notification including the first model type value read from the first memory to the second device. The second device includes a second memory that stores a second model type value and second circuitry that, in response to receiving a notification from the first device, reads the second model type value from the second memory, determines whether or not to perform the initialization process based on the second model type value and the first model type value included in the notification, and performs the initialization process based on a result of the determination. When the information processing apparatus is activated after performing the initialization process based on the determination result, the second circuitry further receives a notification from the first device and reports the second model type value stored in the second memory to the first device when the notification from the first device does not include the first model type value, and the first circuitry stores the second model type value being reported from the second device in the first memory.

Further example embodiments of the present invention provide an information processing method and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

Figure 1:
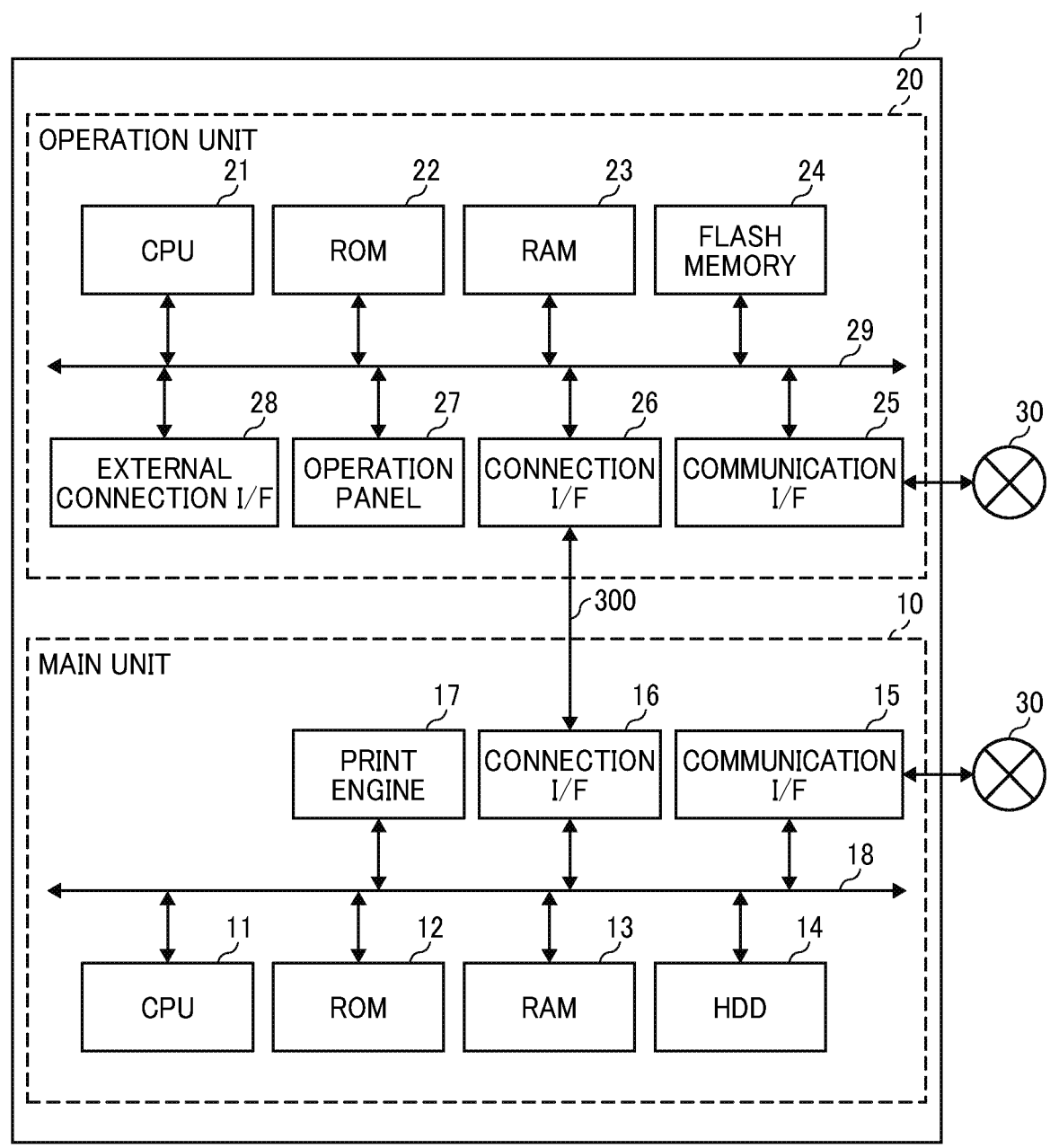
FIG. 1 is a block diagram illustrating a hardware configuration of an information processing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

FIG. 1 is a block diagram illustrating a hardware configuration of an image forming apparatus 1 including an operating unit 20 as an information processing apparatus in this embodiment.

The image forming apparatus 1 is the information processing apparatus that includes multiple image processing functions and image forming functions such as a printer, scanner, copier, and facsimile etc. and referred to as a multifunction peripheral (MFP). In the image forming apparatus 1, a main unit 10 as a first apparatus is combined with the operating unit 20 as a second apparatus. After the main unit 10 and the operating unit 20 are manufactured independently, the operating unit 20 is built into the main unit 10 to complete the image forming apparatus 1.

The main unit 10 includes a central processing unit (CPU) 11, a read only memory (ROM) 12, a random access memory (RAM) 13, a hard disk drive (HDD) 14, a communication interface (I/F) 15, a connection I/F 16, and a print engine 17. In the main unit 10, the components described above are mutually connected with each other via a common bus 18.

The operating unit 20 includes a CPU 21, a ROM 22, a RAM 23, a flash memory 24 as a nonvolatile recording medium, a communication I/F 25, a connection I/F 26, a control panel 27, and an external connection I/F 28. In the operating unit 20, the components described above are mutually connected with each other via a common bus 29.

The connection I/F 16 in the main unit 10 is communicably connected to the connection I/F 26 in the operating unit 20 via an interface cable 300. In addition, the communication I/F 15 and the communication I/F 25 are respectively connected to a network 30 such as a local area network (LAN) etc.

The image forming apparatus 1 is configured to implement predetermined processing functions by executing an information processing program stored in storage media such as the ROM 12 or the HDD 14 etc. in the main unit 10 by using an operation processing function of the CPU 11. In this case, the RAM 13 functions as a work area for the information processing program. Here, the predetermined functions implemented in the main unit 10 are a print function, scan function (scanner function), copy function, facsimile function, and other related functions.

The image forming apparatus 1 is configured to implement predetermined processing functions by executing an information processing program stored in storage media such as the ROM 22 etc. in the operating unit 20 by using an operation processing function of the CPU 21. In this case, the RAM 23 functions as a work area for the information processing program. Here, functions implemented in the operating unit 20 are providing user interface used for performing operating functions implemented in the main unit 10 and executing application software used in combination with the functions described above. Application software and data as a target of initializing the operating unit 20 implemented by executing the information processing program are stored in the flash memory 24 in the operating unit 20.

A part of the functions implemented by executing the information processing program on the operating unit 20 or all of the functions implemented by executing the information processing program on the operating unit 20 may be implemented by using a hardware resource of the main unit 10. In this case, the operating unit 20 mainly provides a user interface via the control panel 27 using processing results performed by the main unit 10.

Otherwise, it is possible to update a model type value stored in the main unit 10 by executing the information processing program by the operating unit 20. The model type value is described in detail later.

It should be noted that the image forming apparatus 1 corresponds to an information processing system including the main unit 10 and the operating unit 20 that are physically separated with each other. Instead of implementing the connection between the main unit 10 and the operating unit 20 using the dedicated interface, it is possible to locate the main unit 10 remotely separated from the operating unit 20 using connection via a communication network.

Next, functional configurations of the main unit 10 and the operating unit 20 included in the image forming apparatus 1 in this embodiment are described below with reference to FIG. 2. Functional blocks illustrated in FIG. 2 are implemented by the hardware resources of the main unit 10 and the operating unit 20 described before in cooperation with the information processing program (described later).

Figure 2:
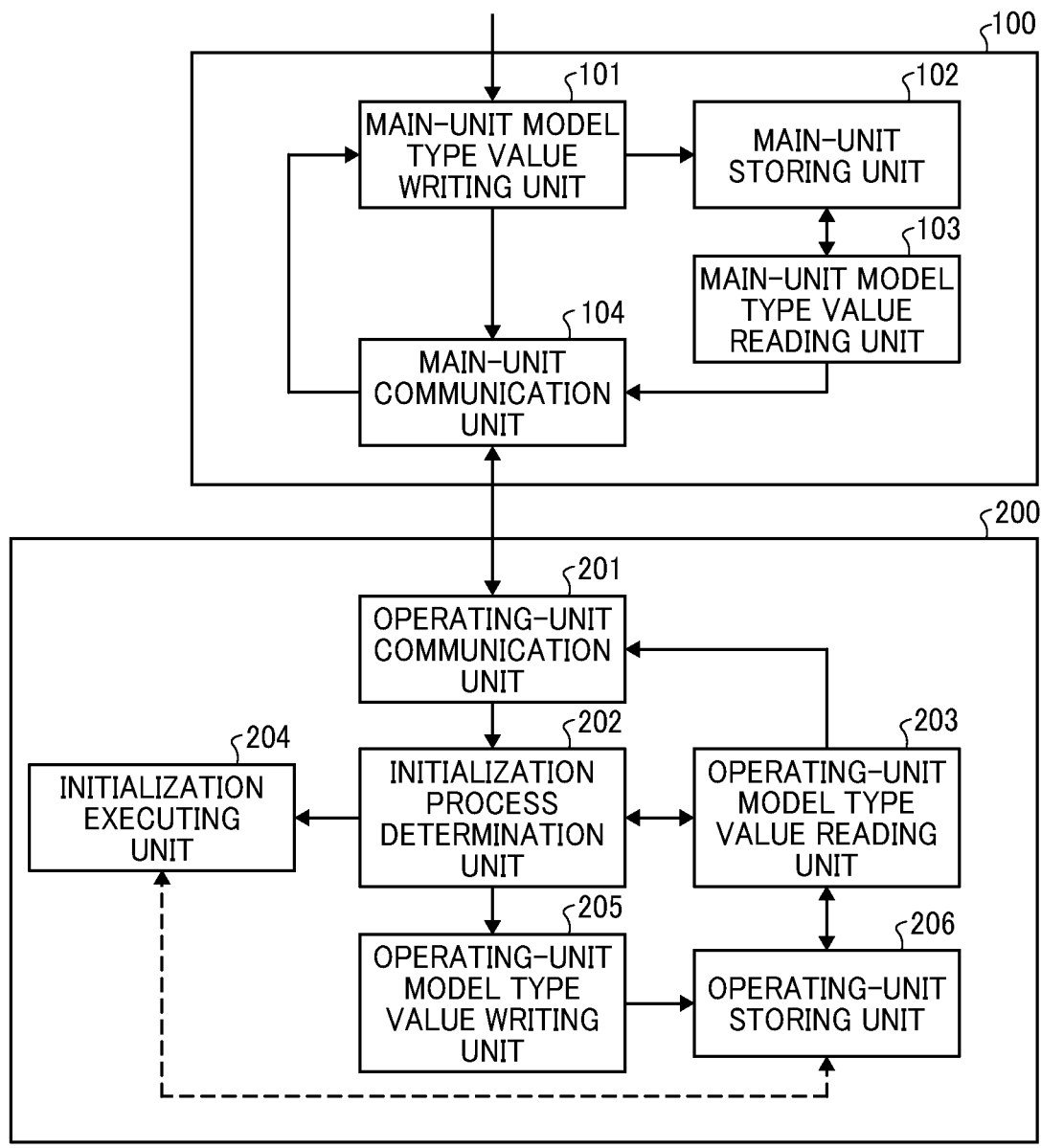
FIG. 2 is a diagram illustrating functional blocks in the information processing system as an embodiment of the present invention.

As illustrated in FIG. 2, a main-unit functional block 100 as functional blocks of the main unit 10 includes a main-unit model type value writing unit 101, a main-unit storing unit 102, a main-unit model type value reading unit 103, and a main-unit communication unit 104.

An operating-unit functional block 200 as functional blocks of the operating unit 20 includes an operating-unit communication unit 201, an initialization process determination unit (determining unit) 202, an operating-unit model type value reading unit 203, an initialization executing unit 204, an operating-unit model type value writing unit 205, and an operating-unit storing unit 206.

The main-unit model type value writing unit 101 is a first data writing unit. In manufacturing the image forming apparatus 1, the main-unit model type value writing unit 101 writes a model type value input based on the specification of the main unit 10 in the main-unit storing unit 102. The main-unit model type value writing unit 101 writes the model type value reported by the operating unit 20 in the main-unit storing unit 102.

The model type value is data for specifying the specification of the image forming apparatus 1, and the specification of the image forming apparatus 1 may be distinguished by using the model type value. As a result, in addition to distinguishing model type value, a content of the initializing process in accordance with the specification may be specified uniquely. Here, the model type value stored by the main-unit functional block 100 (i.e., written in the main-unit storing unit 102) is referred to as "main-unit model type value (first model type value)" hereinafter. In addition, as described below, the model type value stored by the operating unit 20 (i.e., written in the operating-unit storing unit 206) is referred to as "operating-unit model type value (second model type value)" hereinafter.

The main-unit storing unit 102 is a first storing unit. The main-unit storing unit 102 stores the model type value written by the main-unit model type value writing unit 101 as a main-unit model type value.

The main-unit model type value reading unit 103 is a first data reading unit. The main-unit model type value reading unit 103 reads the main-unit model type value stored in the main-unit storing unit 102 and reports the main-unit model type value to the main-unit communication unit 104. In addition, if the main-unit storing unit 102 does not store the main-unit model type value, the main-unit model type value reading unit 103 reports data (first reported data) indicating that the main-unit storing unit 102 does not store the main-unit model type value to the main-unit communication unit 104.

The main-unit communication unit 104 is a first communication unit. The main-unit communication unit 104 reports information (a notification) reported by the main-unit model type value reading unit 103 (i.e., either the main-unit model type value or the first reported data) to the operating unit 20. In addition, if the operating unit 20 reports the operating-unit model type value, the main-unit communication unit 104 receives the operating-unit model type value and reports the operating-unit model type value to the main-unit model type value writing unit 101.

The operating-unit communication unit 201 is a second communication unit. In case of receiving the main-unit model type value or the first reported data reported by the main-unit communication unit 104, the operating-unit communication unit 201 reports the received main-unit model type value or the first reported data to the initialization process determination unit 202. In addition, the operating-unit communication unit 201 reports the operating-unit model type value read from the operating-unit model type value reading unit 203 to the main-unit functional block 100.

Base on the main-unit model type value or the first reported data reported by the main-unit functional block 100 or the operating-unit model type value read from the operating-unit model type value reading unit 203, the initialization process determination unit 202 determines whether or not it is required to perform initialization.

When the operating-unit communication unit 201 reports the main-unit model type value, the initialization process determination unit 202 commands the operating-unit model type value reading unit 203 to read the operating-unit mode type value stored in the operating-unit storing unit 206. Subsequently, by comparing the main-unit model type value reported by the operating-unit communication unit 201 with the read operating-unit model type value, it is determined wither or not the main-unit model type value corresponds to the operating-unit model type value. After performing the determination, if the main-unit model type value does not correspond to the operating-unit model type value, it is reported to the initialization executing unit 204 that the main-unit model type value does not correspond to the operating-unit model type value and the main-unit model type value is reported to the operating-unit model type value writing unit 205.

In reading the operating-unit model type value after reporting the main-unit model type value by the operating-unit communication unit 201, if it is impossible to read the operating-unit model type value, the initialization process determination unit 202 reports the main-unit model type value to the operating-unit model type value writing unit 205.

When the operating-unit communication unit 201 reports the first reported data, the initialization process determination unit 202 commands the operating-unit model type value reading unit 203 to read the operating-unit mode type value stored in the operating-unit storing unit 206 and report the read operating-unit mode type value to the operating-unit communication unit 201.

The operating-unit model type value reading unit 203 is a second data reading unit. In response to the command by the initialization process determination unit 202, the operating-unit model type value reading unit 203 reads the operating-unit model type value from the operating-unit storing unit 206 and reports the operating-unit model type value to the initialization process determination unit 202 or the operating-unit communication unit 201. If the operating-unit storing unit 206 does not store the operating-unit model type value and it is impossible to read the operating-unit model type value, the operating-unit model type value reading unit 203 reports to the initialization process determination unit 202 that it is impossible to read the operating-unit model type value.

If the initialization process determination unit 202 reports that the main-unit model type value does not correspond to the operating-unit model type value or it is impossible to read the operating-unit model type value, the initialization executing unit 204 performs initialization based on the main-unit model type value. The initialization is performed based on an initialization process table stored in the operating-unit storing unit 206. The initialization process table is described in detail later.

The operating-unit model type value writing unit 205 is a second data writing unit. The operating-unit model type value writing unit 205 rewrites the operating-unit model type value stored in the operating-unit storing unit 206 using the main-unit model type value reported by the initialization process determination unit 202.

The operating-unit storing unit 206 is a second storing unit. The operating-unit storing unit 206 stores the operating-unit model type value. In addition, the operating-unit storing unit 206 stores an initialization process table 500.

Figure 3:
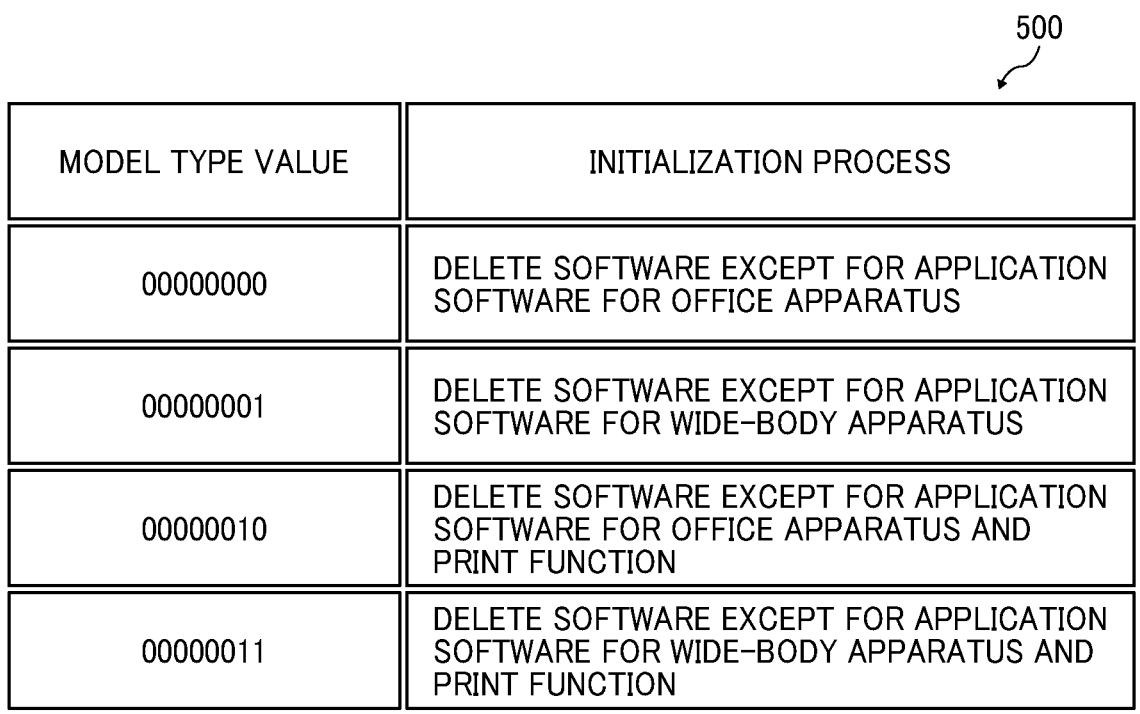
FIG. 3 is a diagram illustrating a data structure of a model type value used for initializing an information processing apparatus as an embodiment of the present invention.

As illustrated in FIG. 3, the initialization process table 500 is a group of data associating, for each one or more model types, a model type value with data indicating a content of an initialization process. The model type value is identification information for uniquely identifying application software executable on the image forming apparatus 1 and setting values to be used by the application software. For example, the model type value may be in an 8-bit value. For example, specifications of the image forming apparatus 1 are different between a wide-format apparatus that prints wide-format sheets and a standard-format apparatus that prints standard-size sheets etc., and a hardware configuration of the main unit 10 and information processing programs installed in the main unit 10 may be different accordingly. On the other hand, the operating unit 20 may use common hardware even if the specification of the main unit 10 is different, since application software can be modified in accordance with the main unit 10, for example, automatically by using the information processing program. As a result, at the time of manufacturing, depending on a specification of a specific apparatus, the operating unit 20 may include unnecessary application software.

In initializing the operating unit 20, the initialization executing unit 204 refers to the initialization process table using the received model type value and executes an operation associated with the model type value. For example, the initialization includes an operation of deleting unnecessary application software etc.

For example, as the content of initialization, as illustrated in FIG. 3, if the model type value is "00000000", the initialization to be performed is an operation of deleting application software other than application software for office apparatus. If the model type value is "00000001", the initialization to be performed is an operation of deleting application software other than application software for wide-format apparatus. If the model type value corresponds to "00000010", the initialization corresponds to an operation of deleting application software other than application software for office apparatus and print function. If the model type value corresponds to "00000011", the initialization corresponds to an operation of deleting application software other than application software for wide-format apparatus and print function.

Examples of initialization process if the main unit 10 is a main unit of the MFP are described above. However, the contents of the initialization are not limited to the examples, and the model type values are not limited to the examples either. For example, the model type value may be configured so that function types and settings of the main unit 10 may be identified uniquely such as a laser printer (LP) whose choices are wide-format apparatus, office apparatus, and only print function is included, or scan function and facsimile function are further implemented etc.

Next, the information processing program in this embodiment is described below.

Figure 4:
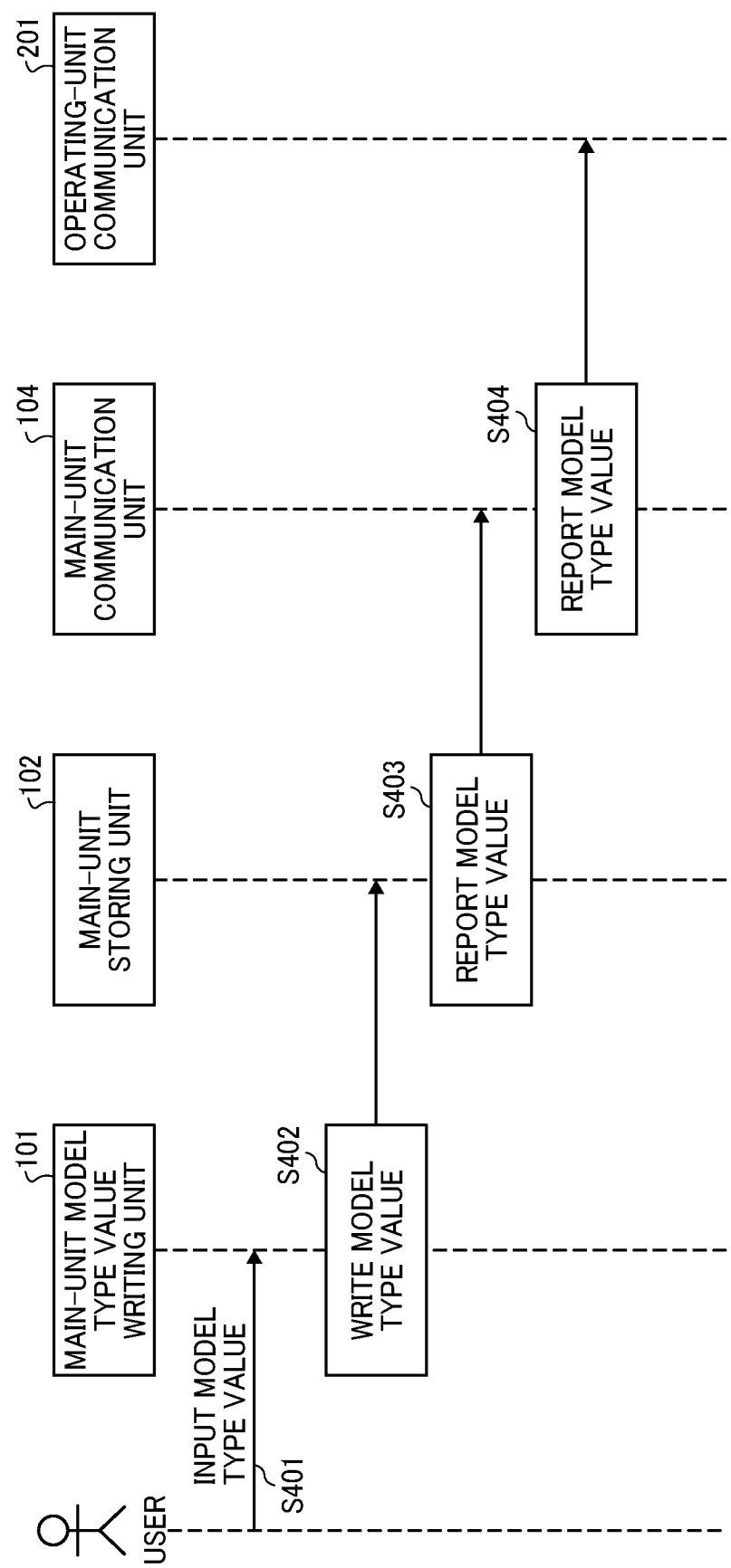
FIG. 4 is a sequence chart illustrating a part of the initializing operation as an embodiment of the present invention.
Figure 5:
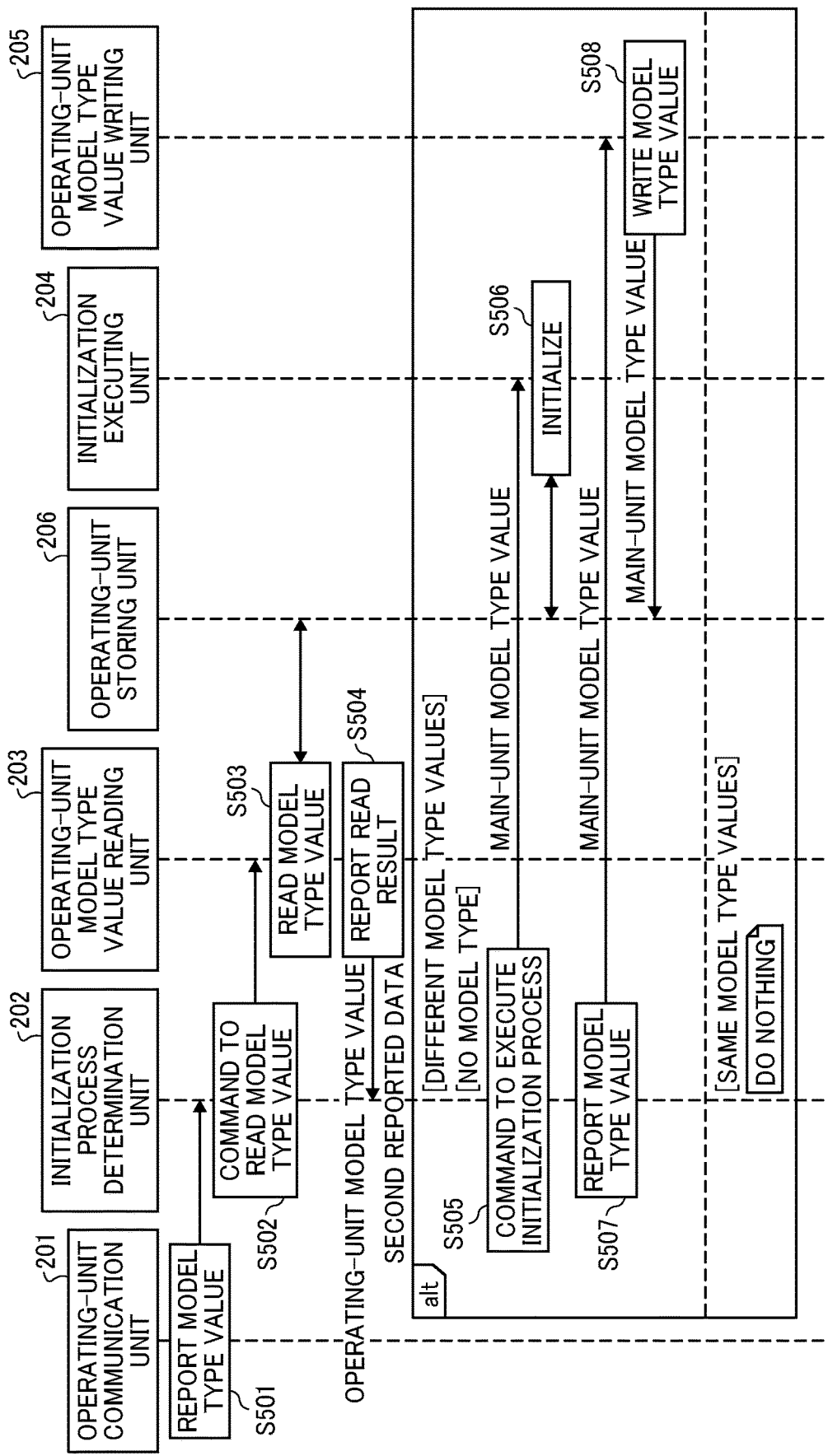
FIG. 5 is a sequence chart illustrating a part of the initializing operation as an embodiment of the present invention.

First, a flow of the initialization process at the time of manufacturing the image forming apparatus 1 is described below. FIGS. 4 and 5 are sequence charts illustrating a flow of the initializing operation performed on the main unit 10 and the operating unit 20 by a manufacturing worker in this embodiment.

First, after the image forming apparatus 1 is booted up by a user as the manufacturing worker, a model type value is input in the main unit 10 by user operation. The main unit 10 receives a user instruction to perform initialization in S401. The input model type value is stored in the main-unit storing unit 102 by the main-unit model type value writing unit 101 in S402. Next, the main-unit model type value writing unit 101 reports the model type value input in S401 to the main-unit communication unit 104 in S403. Subsequently, the main-unit communication unit 104 reports the reported model type value to the operating-unit functional unit 200 in S404. As described above, the main unit 10 reports the model type value to the operating unit 20.

Next, a flow of initialization performed by the operating-unit functional unit 200 after receiving the model type value in S404 is described below with reference to FIG. 5.

The operating-unit communication unit 201 reports the model type value received from the main unit 10 to the initialization process determination unit 202 in S501. The initialization process determination unit 202 commands the operating-unit model type value reading unit 203 to read the model type value (i.e., the operating-unit mode type value) stored in the operating-unit storing unit 206 in S502. The operating-unit model type value reading unit 203 acquires a result of reading from the operating-unit storing unit 206 in S503. If the operating-unit model type value reading unit 203 reads out the model type value, the read model type value is reported as the operating-unit model type value to the initialization process determination unit 202. If the operating-unit model type value reading unit 203 cannot read out the model type value from the operating-unit storing unit 206 as there is no such information, data indicating that the model type value cannot be read out (i.e., a second reported data) is reported to the initialization process determination unit 202 in S504.

In case of receiving the second reported data or receiving the model type value different from the model type value reported by the operating-unit communication unit 201 from the operating-unit model type value reading unit 203, the initialization process determination unit 202 reports the main-unit model type value to the initialization executing unit 204 to command to perform initialization in S505. The initialization executing unit 204 refers to the operating-unit storing unit 206 using the main-unit model type value, determines the content of the initialization as illustrated in FIG. 3, and performs initialization on the operating-unit functional unit 200 based on the determined content of the initialization in S506. After performing initialization, the initialization process determination unit 202 reports the main-unit model type value received from the main-unit functional block 100 to the operating-unit model type value writing unit 205 in S507. The operating-unit model type value writing unit 205 stores the received main-unit model type value as the operating-unit model type value in the operating-unit storing unit 206 in S508. Here, if the model type value received by the initialization process determination unit 202 in S504 corresponds to the model type value reported by the operating-unit communication unit, operations after step S505 are not performed.

Figure 6:
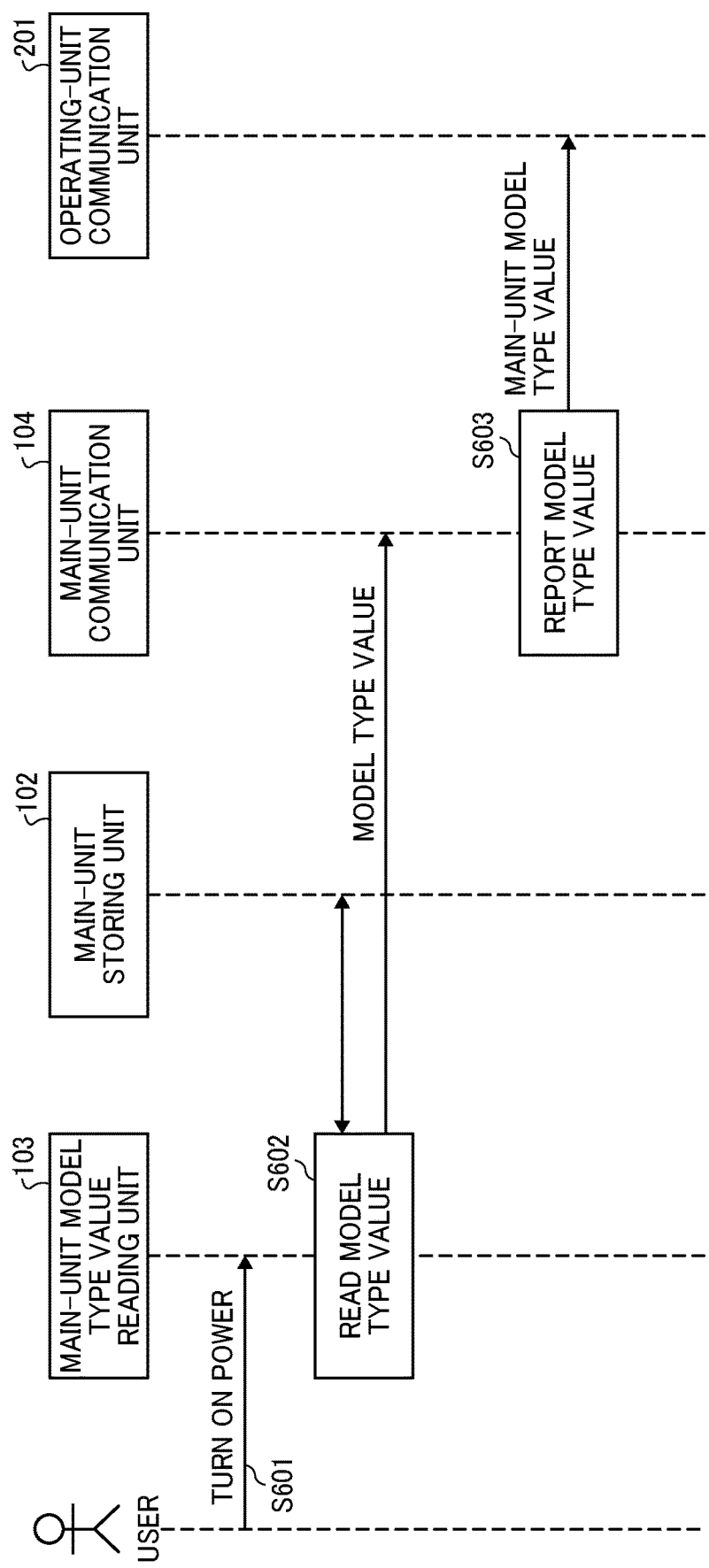
FIG. 6 is a sequence chart illustrating a part of the initializing operation as an embodiment of the present invention.
Figure 7:
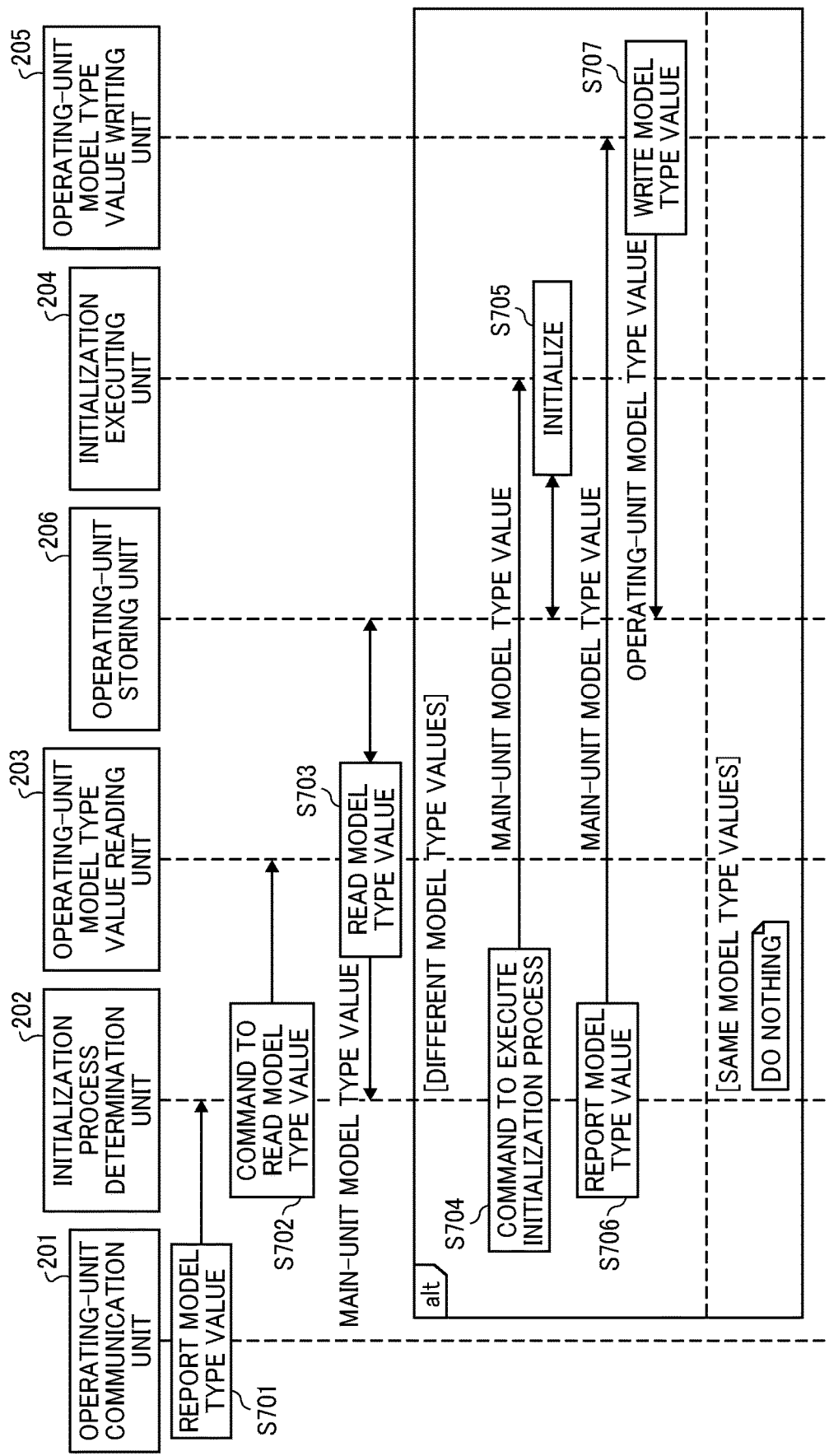
FIG. 7 is a sequence chart illustrating a part of the initializing operation as an embodiment of the present invention.

Next, after the image forming apparatus 1 is shipped from the manufacturing factory, a flow of initialization automatically performed after the image forming apparatus 1 is booted up is described below with reference to FIGS. 6 and 7.

First, a user turns on the image forming apparatus 1 to boot up the main unit 10 in S601. Next, the main-unit model type value reading unit 103 reads the main-unit model type value stored in the main-unit storing unit 102 and reports the main-unit model type value to the main-unit communication unit 104 in S602. Subsequently, the main-unit communication unit 104 reports the reported model type value to the operating-unit functional unit 200 in S603.

Next, a flow of initialization performed by the operating-unit functional unit 200 after receiving the model type value in S603 is described below with reference to FIG. 7.

The operating-unit communication unit 201 reports the model type value received from the main unit 10 to the initialization process determination unit 202 in S701. The initialization process determination unit 202 commands the operating-unit model type value reading unit 203 to read the model type value (i.e., the operating-unit mode type value) stored in the operating-unit storing unit 206 in S702. The operating-unit model type value reading unit 203 reads out the model type value from the operating-unit storing unit 206 and reports the read model type value as the operating-unit model type value to the initialization process determination unit 202 in S703.

If the model type value received from the operating-unit model type value reading unit 203 is different from the model type value reported by the operating-unit communication unit 201, the initialization process determination unit 202 reports the main-unit model type value to the initialization executing unit 204 to command to perform initialization in S704. The initialization executing unit 204 refers to the operating-unit storing unit 206 using the main-unit model type value, recognizes the content of the initialization as illustrated in FIG. 3, and performs initialization on the operating-unit functional unit 200 based on the recognized content of the initialization in S705. After performing initialization, the initialization process determination unit 202 reports the main-unit model type value received from the main-unit functional block 100 to the operating-unit model type value writing unit 205 in S706. The operating-unit model type value writing unit 205 stores the received main-unit model type value as the operating-unit model type value in the operating-unit storing unit 206 in S707. Here, if the model type value received by the initialization process determination unit 202 in S703 corresponds to the model type value reported by the operating-unit communication unit, operations after step S704 are not performed.

Figure 8:
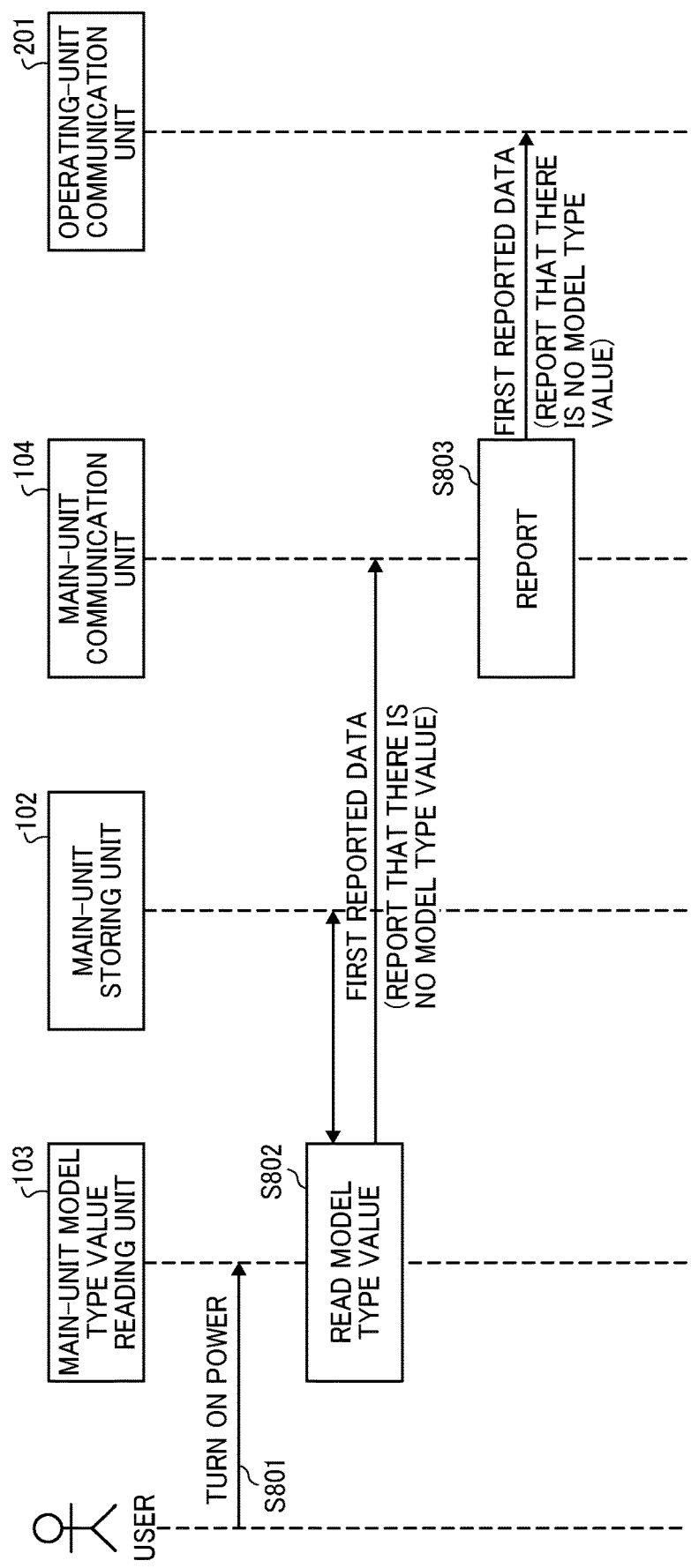
FIG. 8 is a sequence chart illustrating a part of the initializing operation as an embodiment of the present invention.

Next, after the image forming apparatus 1 is shipped from the manufacturing factory and the main-unit model type value is erased by replacing a storage medium such as the RAM 13, ROM 12, and HDD 14 etc., a flow of initialization performed after the image forming apparatus 1 is booted up is described below with reference to FIG. 8.

First, a user turns on the image forming apparatus 1 to boot up the main unit 10 in S801. Next, the main-unit model type value reading unit 103 reads the main-unit model type value stored in the main-unit storing unit 102 and reports the main-unit model type value to the main-unit communication unit 104 in S802. Here, since the main-unit model type value is not stored in the main-unit storing unit 102, data indicating that the main-unit model type does not exist (i.e., the first reported data) is reported to the main-unit communication unit 104 in S802. The main-unit communication unit 104 reports the first reported data reported from the main-unit storing unit 102 to the operating-unit functional unit 200 in S803.

Figure 9:
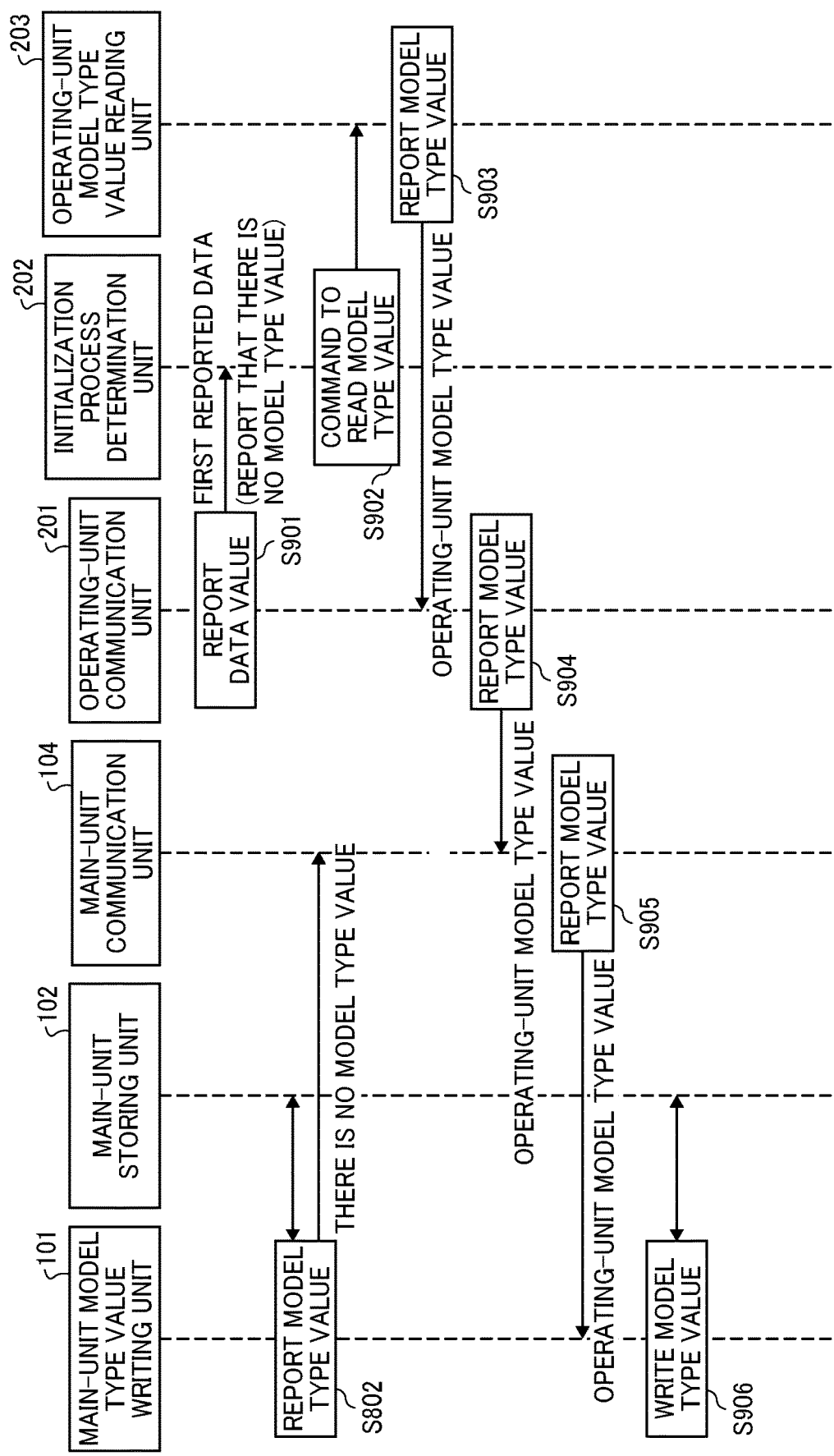
FIG. 9 is a sequence chart illustrating a part of the initializing operation as an embodiment of the present invention.

Next, a flow of initialization after receiving the data indicating that the main-unit model type value does not exist in S803 is described below with reference to FIG. 9.

The operating-unit communication unit 201 reports the first reported data indicating that the main-unit model type value does not exist reported by the main unit 10 to the initialization process determination unit 202 in S901. The initialization process determination unit 202 commands the operating-unit model type value reading unit 203 to read the model type value (i.e., the operating-unit mode type value) stored in the operating-unit storing unit 206 and report the read model type value to the operating-unit communication unit 201 in S902. the operating-unit model type value reading unit 203 reports the read operating-unit model type value to the operating-unit communication unit 201 in S903. In addition, the operating-unit communication unit 201 reports the operating-unit model type value reported by the operating-unit model type value reading unit 203 to the main-unit functional block 100 in S904.

The main-unit communication unit 104 reports the operating-unit model type value received from the operating-unit communication unit 201 to the main-unit model type value writing unit 101 in S905. The main-unit model type value writing unit 101 stores the received operating-unit model type value in the main-unit storing unit 102 in S906.

As described in this embodiment above, If the main-unit model type value is not stored when the user who uses the function of the image forming apparatus 1 boots up the main unit 10, it is possible to acquire the operating-unit model type value from the operating unit 20 automatically and stores the operating-unit model type value as the main-unit model type value. As a result, in a maintenance step that the main unit 10 is replaced or a part of components (i.e., recording medium such as the ROM 12, RAM 13, and HDD 14 etc.), it is possible to perform initialization after the replacement automatically.

That is, both of the main unit 10 and the operating unit 20 in this embodiment are capable of storing the model type value. In addition, the determining operation that determines whether or not the model type value (the main-unit model type value) stored in the main unit 10 corresponds to the model type value (the operating-unit model type value) is performed at predetermined timing, and the model type value stored in the main unit 10 or the operating unit 20 is rewritten using the determination result.

If either the RAM 13 in the main unit 10 or the RAM 23 in the operating unit 20 is replaced, it is possible to perform initialization automatically and appropriately. Furthermore, settings configured when the application software is installed are also reflected automatically. As a result, even if the main unit 10 is an OEM apparatus from another manufacturing company, it is possible to customize the apparatus as if a customer engineer performs initialization manually and sets up application software manually.

The embodiments described above provide the information processing apparatus that may perform required initialization automatically after performing maintenance on the apparatus that replaces some of the components in the apparatus.

Note that the above-described embodiments are examples of embodiments of the claimed invention, and the embodiments of the claimed invention are not limited to the above-described embodiments. The above-described embodiments can be variously modified within the scope of the claimed invention.

For example, elements and/or features of different illustrative embodiments may be combined with each other and/or substituted for each other within the scope of this disclosure and appended claims.

The present invention also encompasses a communication control method performed by a communication control apparatus. The method includes the steps of outputting display control information to display a first list and a second list, the first list including a first condition that associates an address indicating a location on a network with information indicating whether or not to allow communication with a destination identified with the address, and the second list including a second condition that associates identification information identifying a communication protocol with information indicating whether or not to allow communication using the communication protocol, receiving an input of a request to modify the first list and the second list being displayed, generating communication control information in accordance with the first list and the second list each being modified in response to the request, and transferring the communication control information being generated via the network to a transfer apparatus, to cause the transfer apparatus to control communication to be performed via a first communication interface for connecting the network and a second communication interface for connecting a terminal apparatus in accordance with the communication control information being transferred.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
a first device and a second device that operate independent of each other,
the first device including:
a first memory to store a first model type value identifying an initialization process to be performed on the information processing apparatus in accordance with a specification of the first device; and
first circuitry to:
report a notification including the first model type value read from the first memory to the second device; and
the second device including:
a second memory to store a second model type value; and
second circuitry to:
in response to receiving a notification from the first device, read the second model type value from the second memory;
determine whether or not to perform the initialization process based on the second model type value and the first model type value included in the notification; and
perform the initialization process based on a result of the determination,
wherein, when the information processing apparatus is activated after performing the initialization process based on the determination result, the second circuitry further receives a notification from the first device, and reports the second model type value stored in the second memory to the first device when the notification from the first device does not include the first model type value, and
the first circuitry stores the second model type value being reported from the second device in the first memory.

2. The information processing apparatus according to claim 1,
wherein the second circuitry performs the initialization process identified with the first model type value included in the notification being received, when the first model type value included in the notification being received is different from the second model type value being stored in the second memory.

3. The information processing apparatus according to claim 2,
wherein the second circuitry further rewrites the second model type value stored in the second memory with the first model type value after performing the initialization process, when the first model type value included in the notification is different from the second model type value.

4. The information processing apparatus according to claim 1,
wherein the initialization process includes a process of deleting application software that is determined as unnecessary to the specification of the first device.

5. The information processing apparatus according to claim 1,
wherein the first circuitry reports the notification including the first model type value read from the first memory to the second circuitry every time the information processing apparatus is activated.

6. The information processing apparatus according to claim 1,
wherein the second memory further stores initialization process information associating, for each one or more model types of the first device, the model type value and the initialization process to be performed on the information processing apparatus in accordance with a specification of the first device.

7. A method of processing information performed by an information processing apparatus including a first device and a second device, the method comprising:
storing a first model type value in a first memory of the first device, and a second model type value in a second memory of the second device, the model type value identifying an initialization process to be performed on the information processing apparatus in accordance with a specification of the first device;
in response to activation of the information processing apparatus, reporting a notification including the first model type value read from the first memory to the second device;
determining whether or not to perform the initialization process based on the second model type value stored in the second memory and the first model type value being included in the notification;
performing the initialization process based on a result of the determination;
wherein, when the determining determines that the notification from the first device does not include the first model type value, the method further comprises:
with the second device, reporting the second model type value stored in the second memory to the first device; and with the first device, storing in the first memory the second model type value being reported from the second device.

8. A non-transitory, computer-readable recording medium storing a program that, when executed by one or more processors of an information processing apparatus including a first apparatus and a second apparatus, causes the processors to implement a method of processing information, comprising:

storing a first model type value as identification information for identifying an initialization process in accordance with a specification of the information processing apparatus in a first memory;
writing the first model type value in the first memory;
reading the first model type value from the first memory;
reporting a notification including the first model type value to the second apparatus;
receiving the notification from the first apparatus;
storing the first model type value as an second model type value in a second memory;
reading the second model type value from the second memory;
determining whether or not it is required to perform the initialization process based on the second model type value and the first model type value being included in the notification;
performing the initialization process based on a result of the determination;
reporting the second model type value stored in the second memory to the first apparatus if the notification from the first circuitry does not include the first model type value; and
rewriting the first model type value stored in the first memory using the second model type value being reported from the second apparatus.

* * * * *